United States Patent [19]

Kubo et al.

[11] Patent Number: 4,493,874

[45] Date of Patent: Jan. 15, 1985

[54] PRODUCTION OF A MAGNETIC POWDER HAVING A HIGH DISPERSIBILITY

[75] Inventors: Osamu Kubo, Yokohama; Tadashi Ido, Ebina; Tutomu Nomura, Yokohama; Tatsumi Maeda, Kawasaki, all of Japan

[73] Assignee: Tokyo Shibaura Denki Kabushiki Kaisha, Kawasaki, Japan

[21] Appl. No.: 473,200

[22] Filed: Mar. 8, 1983

[51] Int. Cl.³ .............................................. C04B 35/26
[52] U.S. Cl. .................................. 428/403; 252/62.58; 252/62.59; 252/62.63; 423/594; 427/127; 428/406; 428/692; 428/694; 428/702; 428/900
[58] Field of Search ............... 252/62.58, 62.59, 62.63; 423/594; 428/403, 406, 692–694, 900, 702; 427/127

[56] References Cited

U.S. PATENT DOCUMENTS

| | | | |
|---|---|---|---|
| 3,716,630 | 2/1973 | Shirk | 252/62.58 X |
| 4,124,735 | 11/1978 | O'Horo | 252/62.59 X |
| 4,140,645 | 2/1979 | Beall et al. | 252/62.59 X |
| 4,233,169 | 11/1980 | Beall et al. | 252/62.59 |
| 4,341,648 | 7/1982 | Kubo et al. | 252/62.59 X |
| 4,407,721 | 10/1983 | Koike et al. | 252/62.59 |

OTHER PUBLICATIONS

B. T. Shirk, W. R. Buessem, "Magnetic Properties of Barium Ferrite Formed by Crystallization of a Glass".

*Primary Examiner*—Jack Cooper
*Attorney, Agent, or Firm*—Oblon, Fisher, Spivak, McClelland & Maier

[57] ABSTRACT

A hexagonal ferrite magnetic powder for high density magnetic recording, having an improved dispersibility in a binder or paint is obtained by melting a mixture of hexagonal ferrite-forming components and a glass-forming component, and rapidly cooling the resultant molten mixture to obtain an amorphous material. The amorphous material is thermally treated to precipitate fine particles of the hexagonal ferrite therein. The amorphous material containing the precipitated fine particles is dissolved such that the glass-forming component remains on each of said fine particles in an amount of 0.01 to 0.3% by weight based on the weight of the particles.

10 Claims, No Drawings

PRODUCTION OF A MAGNETIC POWDER HAVING A HIGH DISPERSIBILITY

BACKGROUND OF THE INVENTION

1. Field of the Invention

This invention relates generally to a magnetic powder for high density magnetic recording and more particularly to production of a magnetic powder having a high dispersibility suitable for vertical magnetic recording.

2. Description of the Prior Art

Magnetic recording has been based on magnetization along the longitudinal direction of the plane of the recording medium. However, when an attempt is made to perform high density recording in such a system, the demagnetizing field within the recording medium increases. Thus, it is difficult to achieve very high density recording with this recording system.

In order to eliminate such a difficultly, a vertical magnetic recording system has recently been proposed which is based on magnetization along the vertical direction of the plane of the recording medium. In such a recording system, the demagnetizing field within the recording medium decreases even when the recording density is increased, so that this system is quite suitable for high density recording. With the vertical magnetic recording system, it is necessary that the axis of easy magnetization be normal to the surface of the recording medium. Among such recording media, there is known a recording medium which is obtained by mixing magnetic particles with a binder, coating the mixture on a non-magnetic tape, and introducing the tape into a magnetic field such that the plane of the tape is normal to the direction of the magnetic field. As a result, the axis of easy magnetization of the magnetic particle aligns along the direction of the magnetic field. After drying, a recording medium suitable for vertical recording is obtained.

As the magnetic particles, hexagonal ferrites such as barium ferrite ($BaFe_{12}O_{19}$) are usually used. These hexagonal ferrite particles are in plate form and the axis of easy magnetization is normal to the plane of the surface so they are advantageous in that vertical orientation may be easily accomplished by magnetic field orientation processing or mechanical processing. However, in order to use the hexagonal ferrites as a vertical magnetic recording powder, certain conditions must be satisfied.

For example, the hexagonal ferrites are too high in coercive force iHc (generally over 5,000 oersteds) to be recorded by the usual magnetic head. Thus, it is necessary to reduce the coercive force to a value suitable for vertical magnetic recording.

Further, it is preferred that the crystal size of the hexagonal ferrites be controlled within a range of 0.01–0.3 μm for vertical magnetic recording. When the crystal size is less than 0.01 μm, the ferromagnetism necessary for magnetic recording is not obtained, and when it exceeds 0.3 μm, high density magnetic recording cannot be achieved.

It is further required that the hexagonal ferrites be homogeneously dispersed in a medium such as a binder or paint. Therefore, it is necessary that individual ferrite particles not aggregate at least during preparation thereof.

A hexagonal ferrite having a relatively low coercive force and the desired particle size can be obtained by a glass crystallization technique, using hexagonal ferrite-forming components including a coercive force-reducing element as a starting material together with a glass-forming component. However, it has often been found by the present inventors that even a hexagonal ferrite obtained by such a glass crystallization technique could not be uniformly dispersed in a binder or paint, thus resulting in poor vertical alignment and a low squareness ratio of magnetization curve.

SUMMARY OF THE INVENTION

It is a main object of this invention to provide a hexagonal ferrite magnetic powder having an improved dispersibility in a binder or paint.

Another object is to provide a hexagonal ferrite magnetic powder having a particle size suitable for vertical recording.

A further object is to provide a hexagonal ferrite magnetic powder having a relatively low coercive force.

In order to achieve these and other objects which will become apparent from the following detailed description, a mixture of hexagonal ferrite-forming components and a glass-forming component is melted, and the resultant molten mixture is rapidly cooled to obtain an amorphous material according to this invention. The amorphous material is then thermally treated to precipitate fine particles of the hexagonal ferrite therein. The resultant amorphous material containing the fine particles is dissolved to such an extent that the glass-forming component remains on each of the fine particles in an amount of 0.01 to 0.3% by weight based on the weight of the fine particles. Thus, a desired hexagonal ferrite magnetic powder having an improved dispersibility is obtained.

The hexagonal ferrite magnetic powder obtained by the method described above also falls within the scope of this invention.

DETAILED DESCRIPTION OF THE PREFERRED EMBODIMENTS

According to this invention, hexagonal ferrite-forming components and a glass-forming components are well mixed together. The hexagonal ferrite-forming components may be metal oxide or metal oxide precursor components of a hexagonal ferrite having the formula:

$$AO.n(Fe_2O_3)$$

where A is at least one element selected from the group consisting of barium, strontium, lead and calcium, and n is 5 to 6.

The term "metal oxide precursor" is intended to mean a metal compound which can be converted into a corresponding metal oxide upon thermal treatment. Such metal oxide precursor includes metal carbonates and metal hydroxides.

A part of the Fe ions in the ferrite of the above formula may preferably be substituted with a coercive force-reducing element in order to control the coercive force of the ferrite within a desired range suitable for recording by the usual magnetic head. Such a substituted ferrite can be represented by the formula:

$$AFe_{12-2x}Co_xM_xO_{19} \text{ or } AFe_{12-3/2x}Co_xM_{1/2x}O_{19}$$

where A is at least one element selected from the group consisting of barium, strontium, lead and calcium, M is at least one tetravalent element selected from the group consisting of titanium and germanium or at least one pentavalent element selected from the group consisting of vanadium, niobium, antimony and tantalum, and x is a value from 0.5 to 1.1.

The hexagonal ferrite-forming components are used in amounts sufficient to provide the desired ferrite composition and can be suitably determined according to the composition.

The glass-forming component serves to provide a glass matrix in which the hexagonal ferrite particles precipitate upon thermal treatment. Such a glass-forming component includes boron oxide (preferred), phosphorus pentoxide and silicon dioxide. The amount of the glass-forming component should only be sufficient to provide the glass matrix as noted above.

The mixture of the ferrite-forming components and the glass-forming component is melted at a temperature of 1,200° to 1,450°. The molten mixture is then rapidly cooled to obtain an amorphous material. The cooling of the mixture can be conveniently performed by passing the molten mixture between rotating rolls. The amorphous material can be obtained from between the rolls in a ribbon shape.

The resultant amorphous material is heat-treated and the desired fine ferrite particles are obtained separated from each other in the glass matrix. The heat treatment for precipitation of the fine ferrite particles is generally performed at 700° to 850° C. for 2 hours or more, usually 4 to 10 hours, in the air.

After thus precipitating the desired fine ferrite particles in the glass matrix, the glass matrix is dissolved with a weak acid such as dilute acetic acid and phosphoric acid. In this case, it has been found that when the glass-forming component remains on each of the fine particles in an amount 0.01 to 0.3 % by weight based on the weight of the particle after the dissolution, the resultant ferrite particles have an excellent dispersibility in a binder or paint. Therefore, the glass matrix is dissolved such that the glass-forming component remains on each of the fine particles in an amount as described above. If the content of the glass-forming component exceeds 0.3%, the glass-forming component still remains between individual ferrite particles to form secondary particle, leading to low dispersibility and poor vertical alignment of the particles. On the other hand, if the content of the glass-forming component is below 0.01%, the resultant particles will tend to group together due to their mutual magnetic interactions. The glass-forming component remaining on the of the ferrite particles of the invention, which act as a non-magnetic surface layer, reduces or eliminate these magnetic interactions.

The hexagonal ferrite magnetic particles obtained according to this invention are separate from each other, exhibit an excellent dispersibility as noted above, and can provide magnetic recording media having an improved squareness ratio and improved surface gloss. Further, the particle size of the hexagonal ferrite of the invention can be controlled within a range of 0.01 to 0.3 μm. In addition, the hexagonal ferrite can have a relatively low coercive force if the coercive force-reducing element is added to the starting material.

EXAMPLE

As the objective product, magnetoplumbite Ba ferrite was selected and, in order to control the coercive force, $Fe^{3+}$ ions in the Ba ferrite were partially replaced with $Co^{2+}$-$Ti^{4+}$ ions Boron oxide was used as a glass-forming component, and barium oxide was used as a glass-modifier and as a barium ferrite component. Three types of glasses were obtained which satisfied the conditions of x=0.7 in the formula of the substituted Ba ferrite precipitated in these glasses.

The molar ratios of the raw materials in these three types of glasses are shown in Table 1. The ratio of Co-Ti to Fe was calculated assuming that all the Fe ions were the constituent ions of Ba ferrites.

TABLE 1

| Sample No. | $B_2O_3$ | BaO | $Fe_2O_3$ | $TiO_2$ | CoO |
|---|---|---|---|---|---|
| A | 24.5 | 32.0 | 33.3 | 5.12 | 5.12 |
| B | 31.0 | 37.0 | 25.3 | 3.34 | 3.34 |
| C | 40.0 | 40.0 | 15.8 | 2.09 | 2.09 |

The raw materials were well mixed in a mixer and the mixture was placed in a platinum container having a nozzle at the bottom thereof. The mixture was then heated to 1,350° C. with a high frequency heater so as to melt it. Thereafter, pressurized air or $O_2$ gas was emitted from the top of the platinum container to force the mixture from the nozzle over a pair of rolls, each 20 cm in diameter and rotating at 1,000 r.p.m., to rapidly cool the mixture. Thus, an amorphous ribbon 50 μm thick was prepared.

The amorphous ribbon was thermally treated in an electric furnace at 800° C. for 4 hours to precipitate fine particles of the desired substituted Ba ferrite. The fine particles in each case had an average particle size of about 0.1 μm.

The thermally treated amorphous ribbon was immersed in an aqueous acetic acid or in an aqueous phosphoric acid to dissolve the glass matrix. The recovered ferrite particles were washed with water and then dried. The boron oxide content of the ferrite particles was measured.

The ferrite particles thus obtained were mixed with a paint and the mixture was coated on a non-magnetic base material to prepare recording media. The squareness ratio and the surface gloss (reflectance of light incident at an angle of 60° to the plane of the coated surface) of the recording media were measured. Results are shown in Table 2 below.

TABLE 2

| Sample No. | $B_2O_3$ content (% by weight) | Squareness ratio | Surface gloss |
|---|---|---|---|
| A | 0.50 | 0.70 | 9 |
|   | 0.40 | 0.72 | 9 |
|   | 0.30 | 0.85 | 15 |
|   | 0.18 | 0.88 | 30 |
|   | 0.08 | 0.88 | 30 |
|   | 0.008 | 0.70 | 20 |
| B | 0.65 | 0.68 | 8 |
|   | 0.43 | 0.75 | 9 |
|   | 0.35 | 0.85 | 13 |
|   | 0.22 | 0.87 | 29 |
|   | 0.12 | 0.88 | 30 |
|   | 0.009 | 0.75 | 22 |
| C | 0.80 | 0.70 | 8 |
|   | 0.50 | 0.72 | 9 |
|   | 0.42 | 0.72 | 10 |
|   | 0.39 | 0.80 | 10 |
|   | 0.13 | 0.85 | 28 |

TABLE 2-continued

| Sample No. | $B_2O_3$ content (% by weight) | Squareness ratio | Surface gloss |
|---|---|---|---|
| | 0.012 | 0.80 | 25 |

As can be seen from Table 2, ferrite particles having a $B_2O_3$ content above 0.3% and below 0.01% provide a squareness ratio far smaller than 1. It is known in the art that a squareness ratio of 1 implies that all the individual particles are aligned vertically. Further, these particles cannot provide a recording medium having a good surface gloss.

On the contrary, the ferrite particles of the invention having a $B_2O_3$ content within a range of 0.01% to 0.3% can provide a square ratio much closer to 1, and make a recording medium having an improved surface gloss. This implies that the ferrite particles of the invention have an excellent dispersibility in a binder or paint.

Although the Example described above employs barium ferrite, the same effect could be obtained with strontium ferrite or lead ferrite, as well as ferrites substituted with elements other than Co-Ti ions, such as calcium.

What we claim is:

1. A method for manufacturing a hexagonal ferrite magnetic powder for high density magnetic recording comprising:

melting a mixture of hexagonal ferrite-forming components and a glass-forming component;

rapidly cooling the resultant molten mixture to obtain an amorphous material;

thermally treating the amorphous material to precipitate fine particles of the magnetic hexagonal ferrite therein; and dissolving the amorphous material containing the precipitated fine particles such that a glass matrix of the glass-forming component remains on each of said fine particles in an amount of 0.01 to 0.3% by weight based on the weight of the particles, to obtain the hexagonal ferrite magnetic powder having a particle size of 0.01-0.3 μm, said hexagonal ferrite magnetic powder when mixed with a paint and coated on a non-magnetic base material effecting a recording medium that exhibits a higher squareness ratio and/or a higher surface gloss than a recording medium having coated thereon said hexagonal ferrite magnetic powder containing either less than 0.01 or more than 0.3% by weight of said glass matrtix.

2. The method as claimed in claim 1, wherein said glass-forming component is boron oxide.

3. The method as claimed in claim 2, wherein said hexagonal ferrite-forming components are metal oxide or metal oxide precursor components of a ferrite having the formula:

$$AO.n(Fe_2O_3)$$

where A is at least one element selected from the group consisting of barium, strontium, lead and calcium, and n is from 5 to 6.

4. The method as claimed in claim 2, wherein said hexagonal ferrite-forming components are metal oxide or metal oxide precursor components of a substituted ferrite having the formula:

$$AFe_{12-2x}Co_xM_xO_{19} \text{ or } AFe_{12-3/2x}Co_xM_{1/2x}O_{19}$$

where A is at least one element selected from the group consisting of barium, strontium, lead and calcium, M is at least one tetravalent element selected from the group consisting of titanium and germanium or at least one pentavalent element selected from the group consisting of vanadium, niobium, antimony and tantalum, and x is a value from 0.5 to 1.1.

5. The method as claimed in claim 2, wherein said thermal treatment is conducted at a temperature of 700° to 850° C.

6. The method as claimed in claim 2, wherein said dissolution is achieved with phosphoric acid or acetic acid.

7. The magnetic powder for high density magnetic recording comprising fine particles of a hexagonal ferrite having a glass matrix of a glass-forming component present on each of said fine particles in an amount of 0.01 to 0.3 by weight based on the weight of the particle, and manufactured by the method as claimed in claim 1, said hexagonal ferrite magnetic powder having a particle size of 0.01-0.3 μm and when mixed with a paint and coated on a non-magnetic base material effecting a recording medium that exhibits a higher squareness ratio and/or a higher surface gloss than a recording medium having coated thereon said hexagonal ferrite magnetic powder containing either less than 0.01 or more than 0.3% by weight of said glass matrix.

8. The magnetic powder as claimed in claim 7, wherein said glass-forming component is boron oxide.

9. The magnetic powder as claimed in claim 8, wherein said hexagonal ferrite is represented by the formula:

$$AO.n(Fe_2O_3)$$

where A is at least one element selected from the group consisting of barium, strontium, lead and calcium, and n is 5 to 6.

10. The magnetic powder as claimed in claim 8, wherein said hexagonal ferrite is represented by the formula:

$$AFe_{12-2x}Co_2M_xO_{19} \text{ or } AFe_{12-3/2x}Co_xM_{1/2x}O_{19}$$

where A is at least one element selected from the group consisting of barium, strontium, lead and calcium, M is at least one tetravalent element selected from the group consisting of titanium and germanium or at least one pentavalent element selected from the group consisting of vanadium, niobium, antimony and tantalum, and x is a value from 0.5 to 1.1.

* * * * *